Patented Dec. 29, 1931

1,839,061

UNITED STATES PATENT OFFICE

ROY G. TELLIER, OF LANSDOWNE, PENNSYLVANIA, ASSIGNOR TO FRED B. JACKSON, OF WARREN, PENNSYLVANIA

LIQUORS FOR TREATING SUBSTANCES TO FORM COLLOID GELS AND METHOD OF PREPARING SUCH LIQUORS

No Drawing. Application filed April 22, 1927, Serial No. 185,924. Renewed June 13, 1931.

This invention relates to improvements in liquors for treating colloid-gel-forming substances and in methods of preparing such treating-liquors and particularly to improvements in the manufacture of the latter, utilizing by-products of processes by which wood-pulp is made; that is, processes by which wood is so treated that the cellulose part thereof is obtained, as the desired end-product. One of these processes is known as the calcium bisulphite process. The liquor that is a by-product of this process is commonly known as waste sulphite liquor. In my pending application, Serial Number 166,014, I have described a colloid gel product and a method of making the same in which concentrated waste sulphite liquor is utilized as a medium for treating an argillaceous material (such, for example, as Florida fuller's earth) to form a colloid gel which contains organic matter and a mordant and which, by heat-treatment and subsequent washing, is converted into a set-gel that contains carbon and is provided with a cellular structure and is peculiarly well-adapted for use in the purification and decolorization of aqueous liquors (e. g., raw-sugar liquor).

An object of this invention resides in the provision of an improved treating-liquor of the kind just referred to and in the provision of an improved method of preparing such a treating-liquor.

Waste sulphite liquor from the calcium bisulphite process of making wood pulp contains considerable sulphuric acid. This acid is well known to have a corrosive action on most metals, even when the acid is unmixed. In the waste sulphite liquor, this acid is mingled with calcium sulphate, salts of organic acids, and organic matter. In the presence of these substances, the sulphuric acid appears to have a corrosive action that is even greater than that of the acid when it is unmixed; and it is difficult to find containers that will withstand the corrosive action of waste sulphite liquor; even containers of such high acid-resisting properties as are containers made of nickel-chrome alloy, Monel metal, and the like, are eaten away in time by the corrosive action of the liquor. Therefore, it has been found that the concentration of waste sulphite liquor by evaporating the liquor is costly because it requires the frequent replacement of the corroded containers. It has been suggested that the acid nature of the liquor might be neutralized by the addition of lime, the sulphuric acid of the liquor reacting upon the lime to form calcium sulphate. The liquor may, after treatment with the lime, be concentrated to a basis of fifty per cent (50%) total solids, or to a degree of concentration that is denoted by from thirty-one degrees to thirty-two degrees Baumé. In this degree of concentration, the liquor is utilized in the method described in the aforesaid application. It is to be noted, however, that the liquor requires to be acidified to fit it for use in carrying out that method; and this entails outlay for the sulphuric acid used in acidifying the concentrated liquor. Moreover, the concentrated liquor contains a large excess of calcium sulphate, which passes into the product described in the aforesaid application; and this excess calcium sulphate has to be washed out, for best results. As is well known, calcium sulphate is only slightly soluble in water; and much time is required for leaching out the calcium sulphate to the proper degree. Owing to its highly corrosive nature, the by-product liquor derived from the calcium bisulphite treatment of wood is regarded as practically worthless, and has been given the name of waste sulphite liquor.

Another process by which wood is treated in the extraction therefrom of the cellulose part thereof, is known as the caustic soda process. The by-product liquor from this caustic soda process is by no means as corrosive as is the waste sulphite liquor; and it is evaporated down to dryness. The residue of this evaporation treatment is transformed by heat into a mixture of charcoal, mineral ash, and sodium carbonate. This mixture is treated with lime and the sodium carbonate is converted into caustic soda, which is leached out and recovered and again put to use. Since the by-product liquor of the caustic soda process of treatment of wood is susceptible of after-treatment so that there may be recovered from it sodium hydroxide, this by-product liquor is not wholly a waste liquor and is known as spent soda liquor in the trade.

At many plants, both the calcium bisulphite process and the caustic soda process of wood treatment are used.

In carrying out the present invention, the first step is to neutralize the acid quality of the waste sulphite liquor by mingling with it the spent liquor from the caustic soda process. In order to obtain the best results, careful analyses of both the waste liquor and the spent liquor are made so that the proper proportions of each of the two liquors may be taken in order to ensure complete neutralization of the waste sulphite liquor. The caustic soda of the spent liquor is converted by the sulphuric acid of the waste liquor, into sodium sulphate, which is not corrosive in any marked degree in its action upon the metal containers used in the multiple effect evaporators. The mixed liquors are now subjected to an evaporation so that the resulting liquor or product of the present process is brought to the proper degree of concentration for its economical utilization in the carrying out of the process described in the aforesaid application and in the manufacture of the product of that process. To fit it for use in carrying out the latter, the concentrated mixed liquor is next acidified (as, for example, by the addition of sulphuric acid or hydrochloric acid. When, for the waste sulphite liquor used in the process described in the aforesaid application, there is substituted, in carrying out that process, the acidified concentrated mixed liquor of the present invention, it will be found that the colloid-gel that results from the treatment of the argillaceous material with the last-named liquor contains sodium sulphate that is a product derived from the reaction of the caustic soda of the spent soda-liquor with the sulphuric acid of the waste sulphite liquor mixed therewith; and, if, after this reaction just mentioned, the mixed liquor still contains free caustic soda, some of the sodium sulphate will be derived from the reaction that ensues upon the addition of the sulphuric acid to the mixed liquor for the purpose of its acidification, as has hereinbefore just been described; and this sodium sulphate will appear, in the colloid-gel, just referred to, instead of the calcium sulphate that forms a constituent of the colloid-gel which results when waste sulphite liquor is used as the treating-liquor in the process described in the aforesaid application. This sodium sulphate will ordinarily appear in excess quantity in the colloid-gel and will require, for best results, to be leached out therefrom, after it has been predried and subjected to subsequent heat-treatment, as is set forth in the description of the process disclosed in the aforesaid application. However, as is well known, sodium sulphate is very soluble in water, much more so than is calcium sulphate. Therefore, the time required for leaching it from the product of the aforesaid application is comparatively short and much less water is needed in the leaching step. There is, therefore, a decided economy of operation gotten by pursuing the method of neutralization of the waste sulphite liquor by the spent soda liquor, as has been described in the foregoing.

The extraction water or effluent resulting from the leaching step contains sodium salts, particularly sodium sulphate; and these salts are valuable and in quantity well worth recovering. The sodium sulphate recovered from the spent wash water may be used in the manufacture of paper, (for example, wrapping paper); or, the sodium sulphate may be causticized; that is, by treating the sodium sulphate solution with caustic lime, a solution of caustic soda is obtained; and the caustic soda may be recovered from such solution by well known methods and may be utilized in the hereinbefore mentioned caustic-soda process of wood treatment, for example.

In accordance with the provisions of the patent statutes I have hereinbefore described the best mode now known to me of carrying this invention into effect; but I desire it to be distinctly understood that I fully realize that changes may be made therein and that I intend to include within the scope of the claims that follow hereinafter all modifications that do not depart substantially from the spirit of the invention set forth therein and thereby.

I claim:

1. An acidified by-product liquor of the character described containing a water-soluble salt of sodium and resulting from the mixture of waste sulphite liquor with spent soda liquor and the acidification of such mixture.

2. Preparation of an acid treating-liquor for use in the manufacture of colloid gels, comprising neutralizing waste sulphite liquor by mingling therewith spent soda-liquor; and forming from the neutralized mixture an acidified treating-liquor of the character described containing a water-soluble salt of sodium by adding an acid to the neutralized mixture.

Signed at Washington, in the District of Columbia, this 22nd day of April, 1927.

ROY G. TELLIER.